United States Patent
Emmann et al.

[19]

[11] Patent Number: 6,059,252
[45] Date of Patent: May 9, 2000

[54] ARRANGEMENT FOR MOUNTING FUEL TANK TO A MOTOR VEHICLE

[75] Inventors: Siegfried Emmann, Weinstadt; Karl-Heinz Grimm, Reutlingen, both of Germany

[73] Assignee: DaimlerChrysler AG, Stuttgart, Germany

[21] Appl. No.: 09/267,418

[22] Filed: Mar. 12, 1999

[30] Foreign Application Priority Data

Mar. 13, 1998 [DE] Germany .......................... 198 10 934

[51] Int. Cl.[7] .................................................. A47B 97/00
[52] U.S. Cl. .......................................... 248/503; 280/833
[58] Field of Search ................................... 248/503, 317, 248/339, 313; 220/216; 280/833, 164.1

[56] References Cited

U.S. PATENT DOCUMENTS

| | | | |
|---|---|---|---|
| 1,332,240 | 3/1920 | Ward | 280/833 X |
| 3,227,410 | 1/1966 | McCuen | 248/313 X |
| 5,054,799 | 10/1991 | Fingerle | 280/164.1 |

*Primary Examiner*—Ramon O. Ramirez
*Attorney, Agent, or Firm*—Klaus T. Bach

[57] ABSTRACT

In an arrangement for mounting a fuel tank to the undercarriage of a motor vehicle by way of a support bracket and a tension strap extending around the fuel tank, the support bracket includes means engaging one end of the tension strap while the other end of the tension strap forms a loop portion with a bore and a connecting member having one end with a threaded shaft extends through the bore and through a transverse connecting member for engagement with the loop and the other end of the shaft has a hook-like head hooked into an eyelet in the bracket. A nut is threaded onto the threaded end of the shaft for tightening the tension strap and holding the fuel tank in firm engagement with the bracket.

11 Claims, 4 Drawing Sheets

ARRANGEMENT FOR MOUNTING FUEL TANK TO A MOTOR VEHICLE

BACKGROUND OF THE INVENTION

The invention resides in an arrangement for mounting a fuel tank to the undercarriage of a motor vehicle by means of a tension strap.

In conventional arrangements of this type, the fuel container is mounted to a bracket, in engagement with which the fuel tank is firmly held by a tension strap. The bracket is firmly connected to the undercarriage of the motor vehicle. The tension strap is connected to the bracket at its upper and lower ends so as to be under tension. At the lower end, the tension strap is connected to the bracket by a bolt mounted to the bracket. The tension strap forms a loop, which is moved over the bolt and then securely held in place by a locking structure. The upper end of the tension strap is connected to the bracket by way of a ring screw. The ring of the ring screw is disposed between two vertical ribs formed on the bracket and having through-bores receiving a bolt which is secured in its position in the through-bores. The other end of the ring screw includes a threaded shaft which is inserted through a bore in the tension strap and is tightened and secured by a transverse connection member and a counter-nut. In order to be able to mount a fuel tank to a motor vehicle undercarriage using the conventional structures, the ring bolt is first attached to a part of the bracket by means of a bolt. Then the tension strap is mounted at its lower end to the bracket also by means of a bolt. When the lower end of the tension strap is mounted to the bracket, the tank is raised, generally by hand, and is pressed against the bracket. Then the tension strap is placed around the side of the tank remote from the bracket and connected to the bolt-like end of the ring screw. The connection to the ring screw however, is complicated and time-consuming. During the connection of the tension strap to the threaded shaft of the ring screw, the tank with all its weight must be pressed onto the bracket. At the same time, the threaded shaft must be inserted through the bore in the tension strap. After insertion of the bolt through the strap bore, the transverse connection must be installed, the nut and counter-nut must be applied and the tension strap needs to be tightened by tightening the nut on the ring screw. The procedure is particular cumbersome and time consuming because, during the whole process until the nut is mounted onto the threaded shaft, the full weight of the tank must be carried by the person performing the work.

The mounting of the transverse connection and of the two nuts is further difficult since the bolt of the ring screw is disposed within the loop of the tension strap so that it is not easily accessible. As a result, the mounting of the various parts requires a large amount of dexterity and patience. It is also disadvantageous that a multitude of parts is required for the mounting of the fuel tank. Consequently, the mounting of a fuel tank in the conventional manner is not only time-consuming and difficult, but it is also expensive as it requires a multitude of parts.

It is therefore the object of the present invention to provide an arrangement for the mounting of a fuel tank to the body of a motor vehicle, whereby only four parts are needed and the task can be performed easily and rapidly.

SUMMARY OF THE INVENTION

In an arrangement for mounting a fuel tank to the undercarriage of a motor vehicle by way of a support bracket and a tension strap extending around the fuel tank, the support bracket includes means engaging one end of the tension strap, while the other end of the tension strap forms a loop portion with a bore, and a connecting member having one end with a threaded shaft extends through the bore and through a transverse connecting member for engagement with the loop and the other end of the shaft has a hook-like head hooked into an eyelet in the bracket. A nut is threaded onto the threaded end of the shaft for tightening the tension strap and holding the fuel tank in firm engagement with the bracket.

Since the connecting member, by way of which the upper end of tension strap is connected to the bracket, is provided with a hook-like head the fuel tank can be easily and readily installed. In this case, the bracket is part of the vehicle body. The connecting member may already be connected to the tension strap before the fuel tank is raised. The end of the connecting member remote from the hook-like head is inserted through the bore in the loop portion of the tension strap and is secured by a transverse retaining structure and the nuts. The interconnection of the connecting member with the tension strap is particularly simple since, at this point, the tank does not need to be raised nor is there any tension effective on the tension strap.

The end of the connecting member remote from the tension strap is also connected to the vehicle body, without any forces being effective thereon, by way of a clamping structure and/or bolt connection. This can also be done before the actual mounting of the fuel tank.

For the mounting of the fuel tank to the undercarriage of the motor vehicle, the tank is raised after the tension strap is pre-mounted and the tank is held in the position in which it is to be attached. Then the tension strap is placed around the tank area remote from the undercarriage mounting surface. For the attachment of the tank then only the hook-like head of the clamping structure needs to be hooked over a bolt adapted to the curvature of the bolt head or over a transverse web of the undercarriage. The hook-like head can be easily attached since the connecting member is only loosely connected to the tension strap and consequently provides for sufficient play for the mounting procedure. After the attachment of the hook-like head, the nuts disposed on the threaded end of the connecting member opposite the hook-like head are tightened so as to firmly engage the fuel tank with the undercarriage.

With the hook-like head provided on the connecting member, there is no longer a need for the ring screw conventionally used for the mounting of the fuel tank and no need for the bolts with the respective securing elements. Also, the bolt and securing element used so far at the end of the tension strap remote from the tensioning structure can be eliminated.

Advantageous embodiments of the invention will be described below in greater detail on the basis of the accompanying drawings.

DESCRIPTION OF PREFERRED EMBODIMENTS

Figure 1:
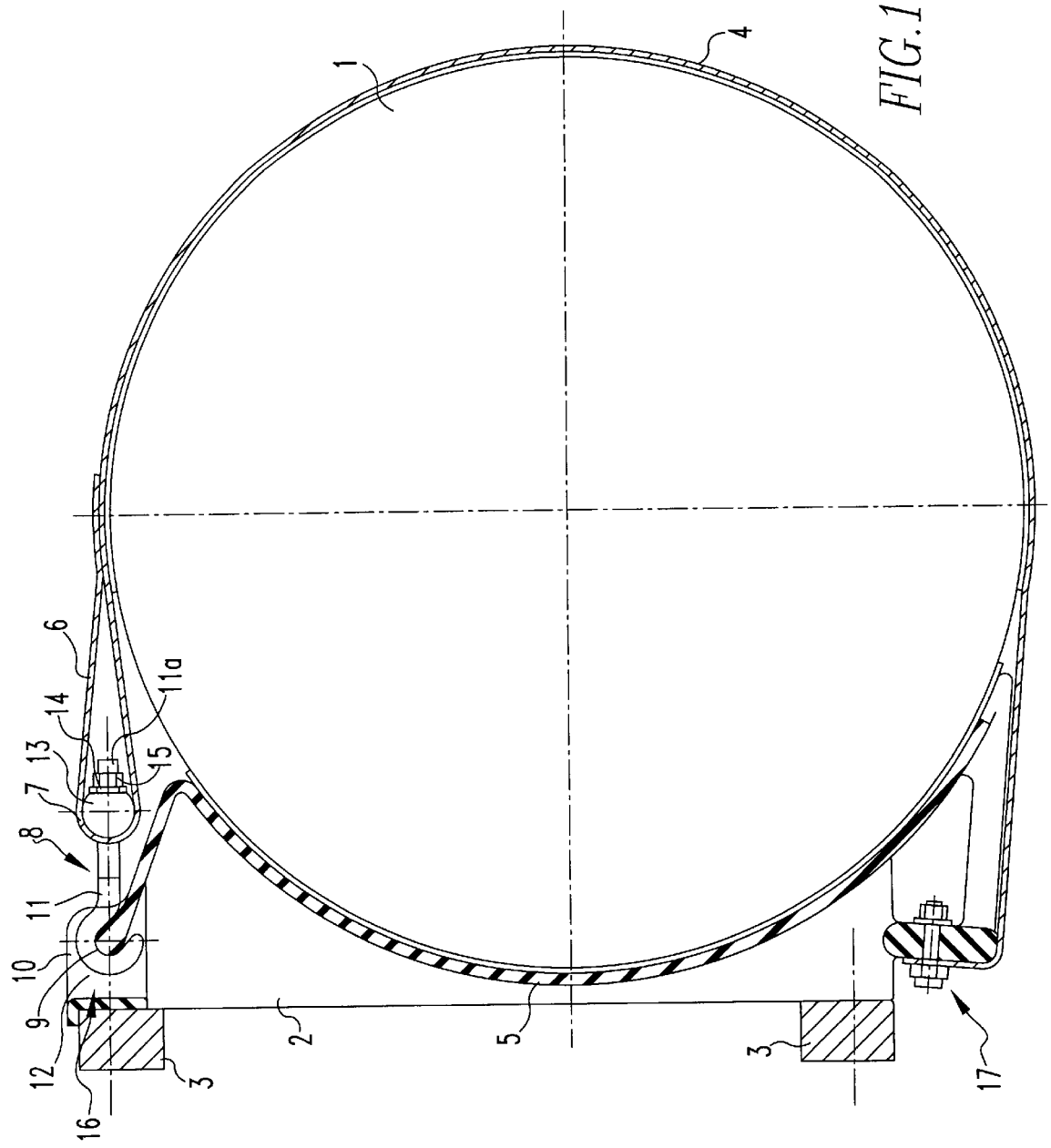
FIG. 1 is a cross-sectional view of the arrangement according to the invention for mounting a fuel tank, wherein the mounting elements are shown schematically.

As shown in FIG. 1, the arrangement for the mounting of a fuel tank 1 to an undercarriage of a motor vehicle comprises a bracket 2, which is a part of the undercarriage 3. The bracket 2 is mounted to the undercarriage 3 by conventional means such as screws. The fuel tank 1 is held in engagement with the bracket 2 by a tension strap 4, which holds the tank fixed in position. For the mounting of the fuel tank 1, preferably two spaced tension straps are used.

Also, other tanks or containers can be mounted by the mounting arrangement according to the invention. In order to provide for optimal attachment and also for isolation of the fuel tank 1 between the bracket 2 and the tension strap 4, a profiled rubber pad 5 is disposed between the fuel tank 1 and the bracket 2 and, respectively, the tension strap 4.

Figure 8:
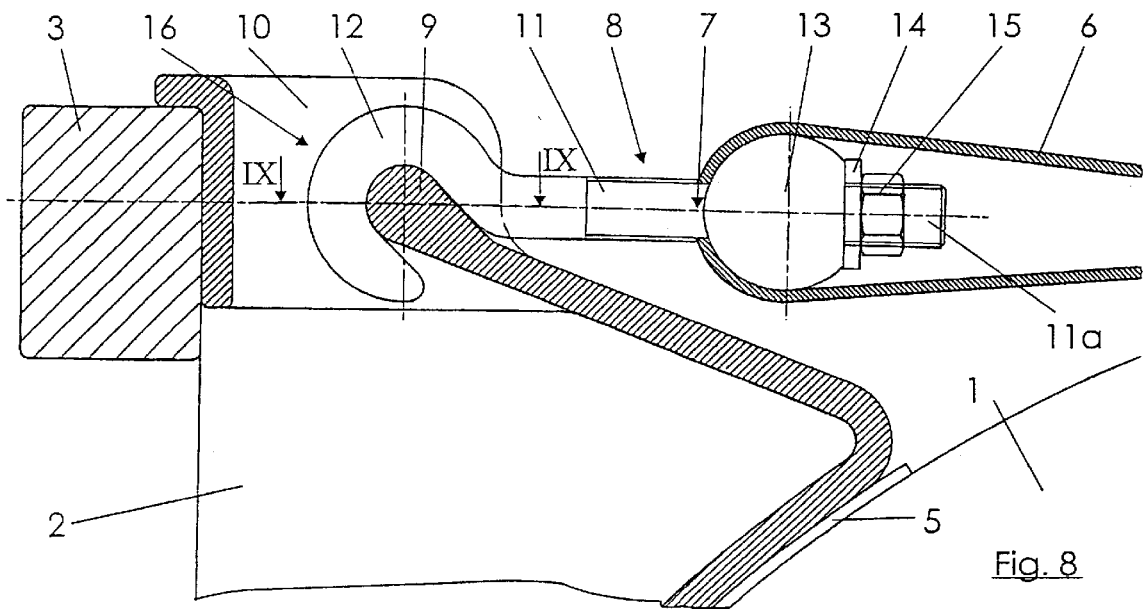
FIG. 8 is an enlarged representation of the upper clamping structure of FIG. 1.

As shown in FIG. 1 and, in an enlarged form, in FIG. 8, the tension strap 4 includes at one end a loop 6 with a bore 7. The loop 6 of the tension strap 4 is then connected to the bracket 2 or the undercarriage 3 by way of a tensioning device 8 and a transverse web 9.

Figure 9:
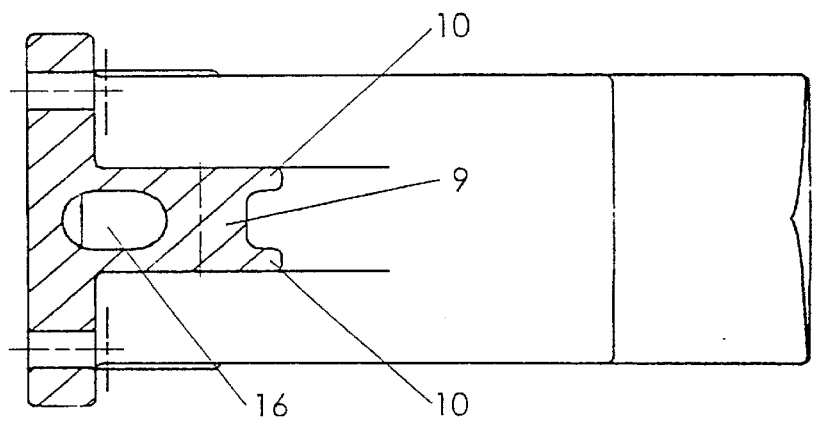
FIG. 9 is a partial cross-sectional view taken along line IX—IX of FIG. 8.

The transverse web 9 extends between two vertical ribs 10 of the bracket 2 (see also FIG. 9). The tensioning device 8 includes a connecting member 11 with a threaded shaft 11a and a hook-like head 12, a transverse connecting structure 13, a nut 14 and a counter nut 15.

For the connection of the tensioning device 8 with the loop 6 of the tension strap 4, the threaded shaft 11a of the connecting member 11 is inserted through the bore 7. Then the transverse connecting structure 13 is placed over the end of the threaded shaft 11a. The transverse connecting structure is held in place on the threaded shaft 11a by the nut 14 and the counter-nut 15. The connecting member 11 is mounted to the loop 6 of the tension strap 4 when the strap 4 is not under tension, that is, the components are assembled without any forces effective on the tension strap 4 or the connecting member 11. The connecting member 11 is only loosely connected to the loop 6 at this point, that is, the nut 14 and the counter-nut 15 are threaded onto the threaded shaft 11a only so far that the transverse connecting structure 13 is securely captured on the connecting member. This loose mounting of the nut 14 and the counter nut 15 later facilitates the mounting of the tension strap 4 and the fuel tank 1 since only small forces are required to hook the hook-like head 12 of the connecting member 11 onto the transverse web 9.

The outer curvature of transverse web 9 is adapted to the inner curvature of the hook-like head 12 of the connecting member 11. In this way, a good connection is established between the connecting member 11 and the transverse web 9.

As apparent from FIG. 9, an eyelet 16 is formed behind the transverse web 9 into which the hook-like head 12 can be inserted. The transverse web 9 is slightly recessed by the ribs 10 toward the undercarriage 3. The hook-like head 12 is therefore guided at opposite sides, when inserted into the eyelet 16. The end of the tension strap 4 opposite the tensioning device 8 is mounted to the bracket 2 by means of a clamp structure or by a bolt connection 17. The clamp structure or bolt connection is shown in FIG. 1 only schematically. Various embodiments can be used for this connection.

Figure 2:
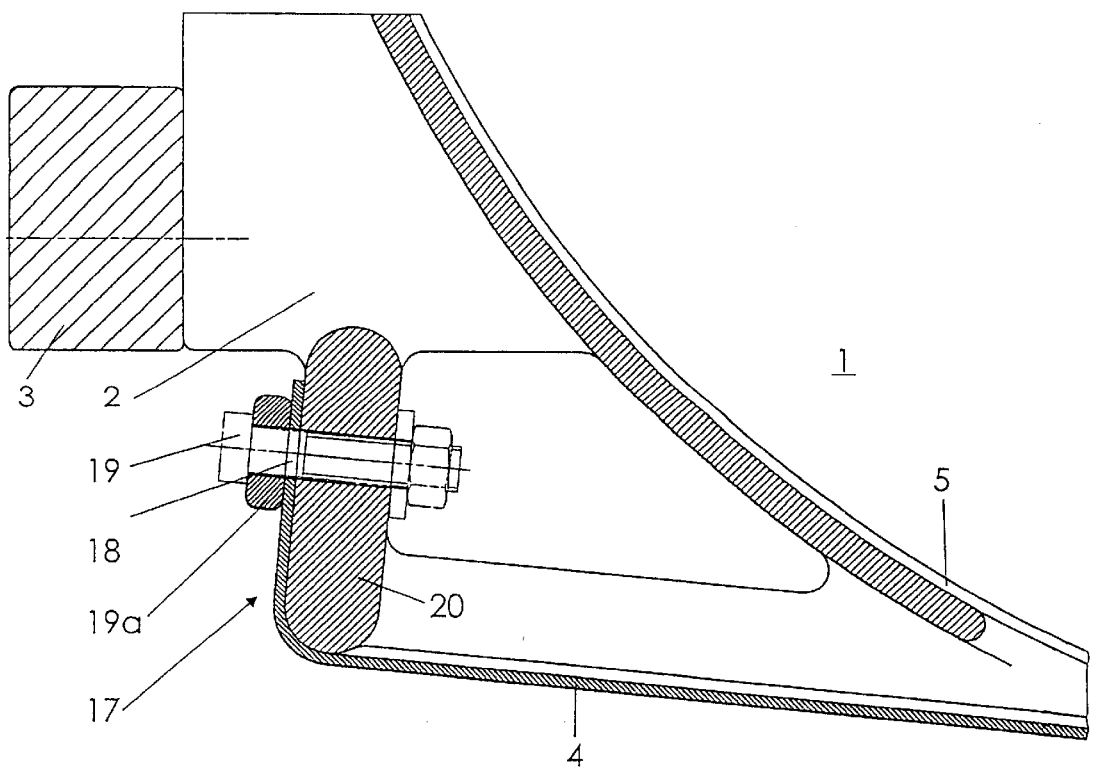
FIG. 2 is an enlarged representation of a first embodiment of the bolt connection at one end of the tension strap.

FIG. 2 shows the tension strap 4 at its end opposite the tensioning device 8 provided with a bore 18. The bolt connection 17 includes a clamping bolt 19, which is inserted through the bore 18 and through a flange 20 of the bracket 2. In this way, the end of the tension strap 4 having the bore 18 is clamped between the head of the clamping bolt 19 and the flange 20 of the bracket 2.

Instead of being provided with a bore 18, the tension strap 4 may also be mounted to the flange 20 by means of a clamping plate 19a. The clamping plate 19a would be mounted onto the flange 20 by clamping bolts extending through aligned bores extending through the flange 20 and the clamping plate 19a on opposite sides of the tension strap 4.

Figure 3:
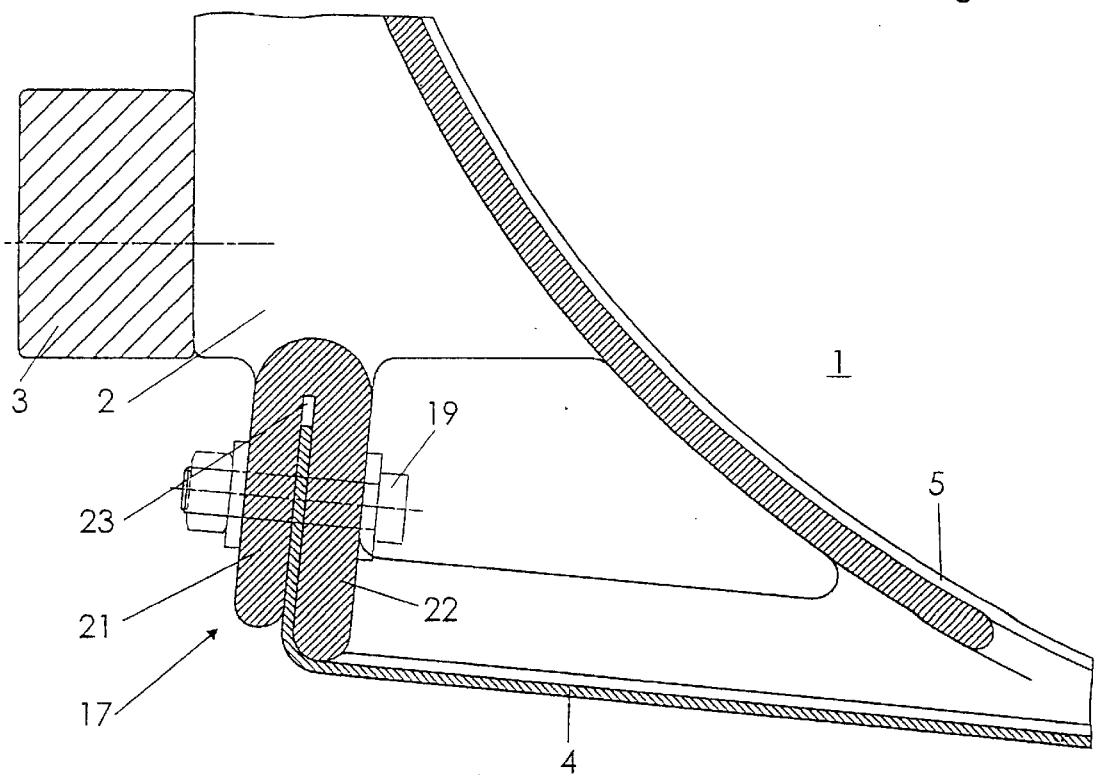
FIG. 3 is an enlarged representation of a second embodiment of the bolt connection for the tension strap.

Another embodiment is shown in FIG. 3. In this embodiment, the clamp structure 17 includes a clamping plate 21 and a counter clamping plate 22, which are both part of the bracket 2. Between the clamping plate 21 and the counter clamping plate 22, there is a gap 23 into which the end of the tension strap 4 remote from the tensioning device 8 is inserted. The clamping plate 21 and the counter-clamping plate 27 include spaced bores through which the clamping bolts 19 are inserted. The clamping plate 21 and the counter-clamping plate 22 are pressed together by the clamping bolts 19 and consequently, firmly engage the tension strap in the gap 23. Preferably, the spaced bores for the clamping bolts 19 are disposed closely adjacent the tension strap end disposed therebetween so that the tension strap is firmly engaged without the need for a hole and a bolt extending through the strap.

Figure 4:
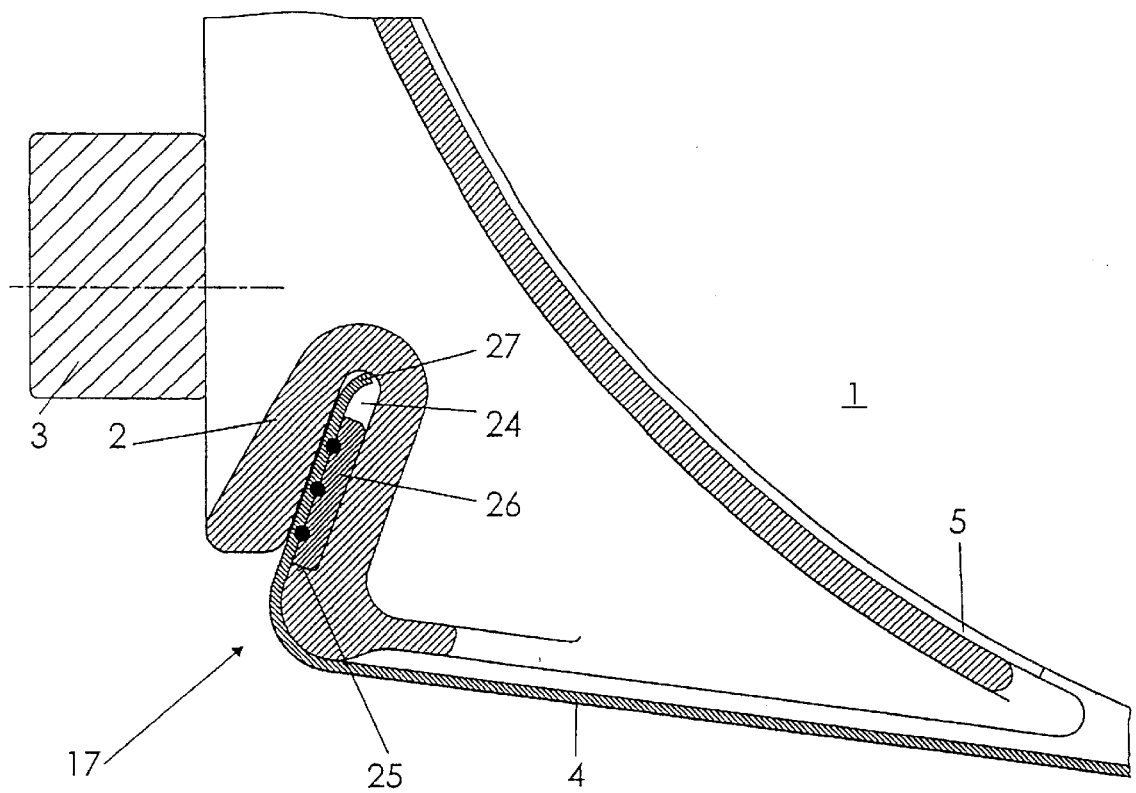
FIG. 4 shows a third embodiment of the connection of one end of the tension strap to the vehicle body.

FIG. 4 shows another embodiment for the clamp structure 17, wherein clamping screws 19 are not needed. The clamp structure 17, in this case, includes a gap space 24 formed by the bracket 2. In the pulling direction of the tension strap 4, the gap space 24 is provided with a wall portion forming a stop 25. The tension strap is provided at its end remote from the tensioning device 8 with an abutment plate 26, which may be connected to the tension strap 4 by spot welding or by cementing. In order to mount the tension strap 4 to the bracket 2, the tension strap 4 is inserted, together with the abutment plate 26, from one side into the gap space 24. As can be see from FIG. 4, the abutment plate 26 engages the stop 25. The abutment plate 26 fills only a part of the gap space 24. At its free end within the gap space 24, the tension strap 4 has a bent-over end portion 27. The bent-over end portion 27 engages the inner wall of the gap space 24 and provides a clamping action (see also FIG. 5). As shown in FIG. 6, the free end 27 provides for increased clamping action in the gap space 24. By a cooperation of the clamping action and the engagement by the tension strap with the stop 25, the tension strap 4 is firmly engaged with the bracket 2 and such engagement is easily established.

Figure 7:
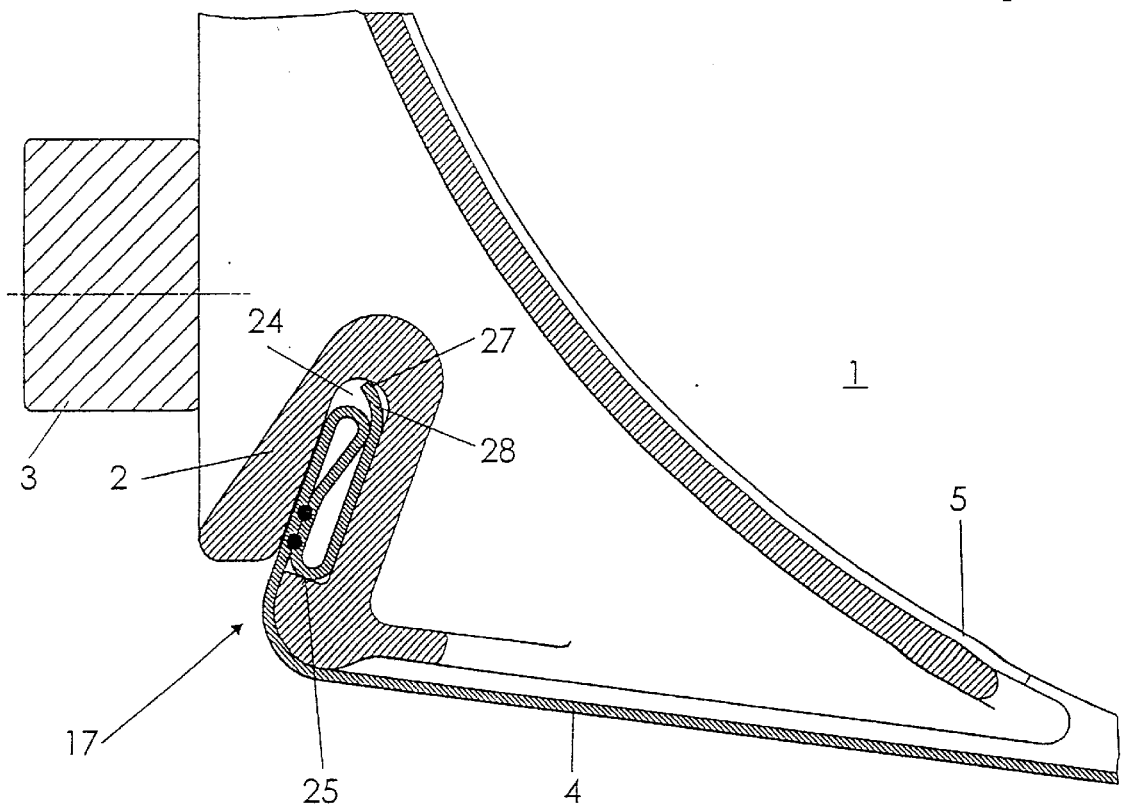
FIG. 7 is an enlarged representation of a fourth embodiment of the clamping arrangement according to FIG. 1.
Figure 5:
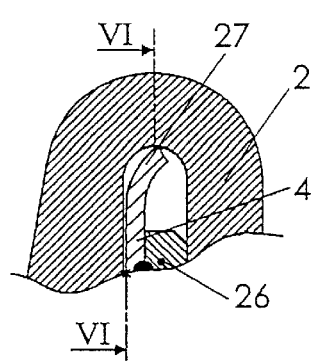
FIG. 5 is an enlarged view of the end of the tension strap disposed in the gap area of a clamping structure.
Figure 6:
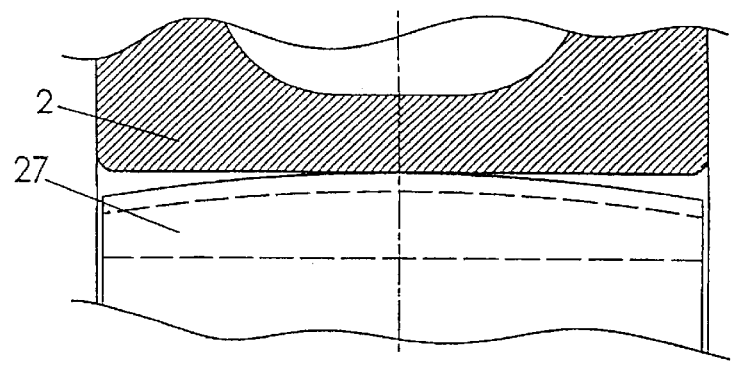
FIG. 6 is an enlarged view of a cross-sectional area taken along line VI—VI of FIG. 5.

FIG. 7 shows a variation of the clamping arrangement 17 shown in FIGS. 4, 5, and 6. Herein, the bracket 2 is formed similarly as shown in FIG. 4. It also includes a gap space 24 having a stop 25 and the end of the tension strap 4 is inserted into the gap space 24. The end of the tension strap 4 is folded to a double loop, which is held together by spot welding or cementing. The double loop of the tension strap 4 is formed in such a way that, after forming the second loop, the free end 28 of the tension strap 4 projects somewhat and is bent over to form the bent-over end portion 27, as it is described already with respect to FIGS. 4 and 5.

For mounting the fuel tank 1 to the vehicle undercarriage 3, that is, respectively, the bracket 2, first the connecting member 11 is connected to the loop 6 by inserting the threaded shaft 11 through the transverse connecting structure 13 and loosely mounting the nut 14 and the counter-nut 15. Then the end of the tension strap remote from the tensioning device 8 is connected to the bracket 2, or respectively, the undercarriage 3, by way of the clamping structure 17. When this connection is established the fuel tank 1 is raised and pressed in place onto the curved portion of the bracket 2. Then the hook-like head 12 is hooked over the transverse web 9, whereby the fuel tank 1 is loosely supported in place. Subsequently, the nut 14 is tightened and the strap 4 is tensioned until the fuel tank 1 is firmly engaged with the bracket 2. Then the counter-nut 15 is also tightened to prevent the nut 14 from coming loose.

For the mounting of a fuel tank 1 generally two tension straps 4 and the corresponding amount of clamping structures 17 and tensioning devices 8 are required.

What is claimed is:

1. An arrangement for mounting a fuel tank to the undercarriage of a motor vehicle, said arrangement comprising a support bracket adapted to be connected on said undercarriage for engaging said fuel tank a tension strap adapted to the extending at least partially around said fuel tank when said tank is mounted to said bracket, means firmly engaging one end of said tension strap with said support bracket, the other end of said tension strap forming a loop portion having a bore, a tensioning structure including a connecting member having one end with a threaded shaft extending through said bore and through a transverse connecting structure disposed in said loop and the other end of said connecting member being provided with a hook-like head, said bracket having an eyelet receiving said hook-like head, and a nut disposed on said threaded shaft and engaging said transverse connecting structure and permitting tightening said tension strap for retaining said fuel tank in firm engagement with said support bracket.

2. An arrangement according to claim 1, wherein said support bracket includes two vertically extending spaced ribs and said eyelet is formed by a transverse web extending between said ribs.

3. An arrangement according to claim 2, wherein said means for engaging one end of said tension strap includes at least one clamping bolt extending through a flange of said bracket, the end of said tension strap being firmly engaged between a head of said clamping bolt and said flange of said bracket.

4. An arrangement according to claim 3, wherein said clamping bolt extends through a bore in a clamping plate, and said tension strap extends below said clamping plate and is engaged with said bracket flange by said clamping bolt via said clamping plate.

5. An arrangement according to claim 1, wherein said means for firmly engaging said one end of said tension strap includes a flange provided by said bracket and a clamping plate disposed on said flange with a gap remaining therebetween and the end of said tension strap is received in said gap and wherein clamping bolts extend through said flange and said clamping plate for firmly engaging said tension strap between said flange and said clamping plate.

6. An arrangement according to claim 5, wherein said gap forms a space having an end wall forming a stop and said tension strap includes at its end within said gap an abutment structure having an end wall engaging said stop.

7. An arrangement according to claim 6, wherein said abutment plate is mounted to said tension strap by spot welding.

8. An arrangement according to claim 6, wherein said tension strap has a curved end portion disposed in said gap, said curved end portion engaging the wall of said clamp forming said gap.

9. An arrangement according to claim 6, wherein the end portion of said tension strap extending into said gap is curved in a transverse direction.

10. An arrangement according to claim 6, wherein said one end of said tension strap is folded so as to form a double loop forming said abutment structure which is disposed in engagement with said stop in said gap.

11. An arrangement according to claim 10, wherein the free end of said tension strap extending into said gap is curved so as to engage the walls of said gap under tension.

* * * * *